INVENTOR.
WALTER HERBERT ERWIN WIDEL
BY Hane and Nydick
ATTORNEYS

WALTER HERBERT ERWIN WIDEL INVENTOR.

BY Haue and Nydick

ATTORNEYS

INVENTOR.
WALTER HERBERT ERWIN WIDEL
BY Hane and Nydick
ATTORNEYS

United States Patent Office 3,436,730

Patented Apr. 1, 1969

3,436,730

METHOD OF DETECTING AND CORRECTING AN ERROR IN POLARITY CHANGE IN A DATA TRANSMISSION SYSTEM

Walter Herbert Erwin Widel, Bandhagen, Sweden, assignor to Telefonaktiebolaget L M Ericsson, Stockholm, Sweden, a corporation of Sweden Filed May 12, 1965, Ser. No. 455,194
Claims priority, application Sweden, May 28, 1964, 6,465/64
Int. Cl. G08b 29/00; G08c 25/00
U.S. Cl. 340—146.1 1 Claim

ABSTRACT OF THE DISCLOSURE

A data communication system comprises a transmitter which sends binary coded data elements represented by phase modulated differential coding signals to a receiver. In the receiver are means for detecting and converting double errors arising in the transmission because of the coding technique to single errors which can be detected and corrected by conventional parity checkers. The detecting and correcting means include integrating means for separately integrating the positive and negative lobes of the each received data element to produce two signals which are combined to produce a difference signal. The magnitude of the difference signal is compared with a predetermined threshold value. If the magnitude is less than the threshold value a signal is generated which activates means for reversing the sense of the related data signal element which thus reduces the double error to a single error.

The present invention relates to detecting and correcting an error in a data transmission system using phase shift modulation with differential coding.

Differential coding permits the carrying out of the regeneration of the demodulation frequency in a more simple way than with simple phase shift modulation. Differential coding implies that at the sender side a 1-polarity signal element is transmitted as a signal element which changes polarity at the center of its time slot, while a 0-polarity in the signal element does not cause any change of polarity. At the receiver side a 1-polarity signal is generated during a signal element-length if two signal elements with different polarities are sequentially received, while the reception of two signal elements with the same polarity cause 0-polarity signal to be generated. Such a system, for an erroneously occurring change of polarity or a non-occurring change of polarity, will always lead to a double error, as is easy to understand.

An object of the invention is to reduce such a double error to a single error that may be detected through conventional methods, for example, by means of redundancy in the information transmitted. This is effected according to the invention in such a way that, for each received signal element in the data signal transmitted, the positive and the negative voltage of the signal element is integrated separately and the difference between the integrals is compared with a threshold value. A falling below this value implies that the polarity of the signal element cannot be determined with certainty, and the sign of the signal element received is shifted to a sign with opposite polarity if the comparison would show that the difference between the integrals is below the threshold value in order to reduce the double error to a single error which may be eliminated by means of conventional methods.

Figure 1:
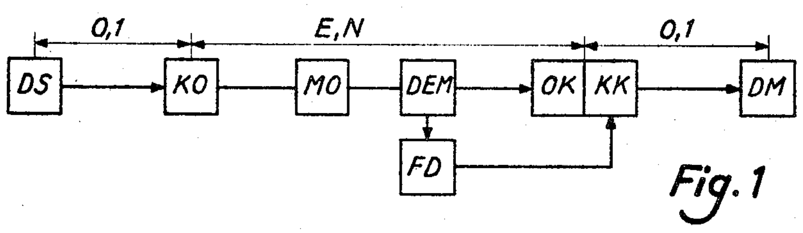
Figures 2A, 2B, 2C, 2D, 2E, 2F, 2G, 2H, 3A, 3B, 3C, 3D, 3E, 3F, 3G:
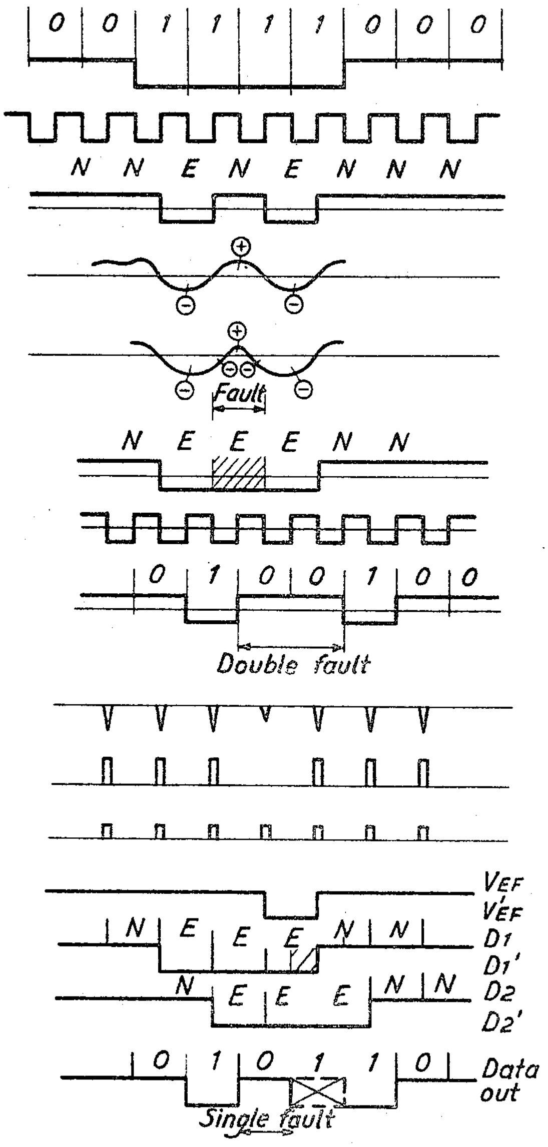
Figure 5:
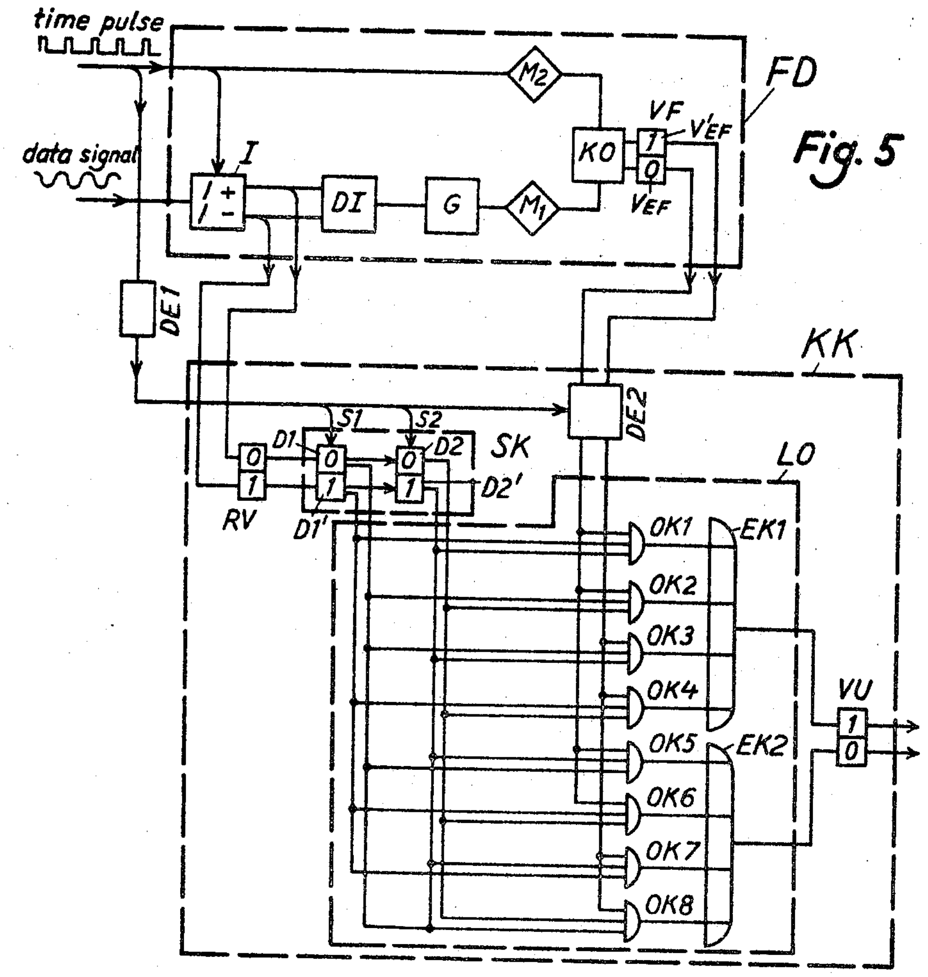
Figure 4:
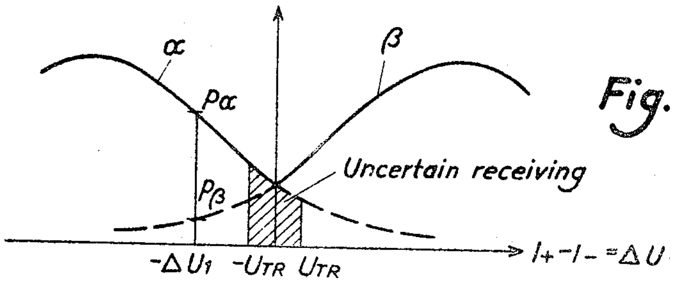
Figure 6:
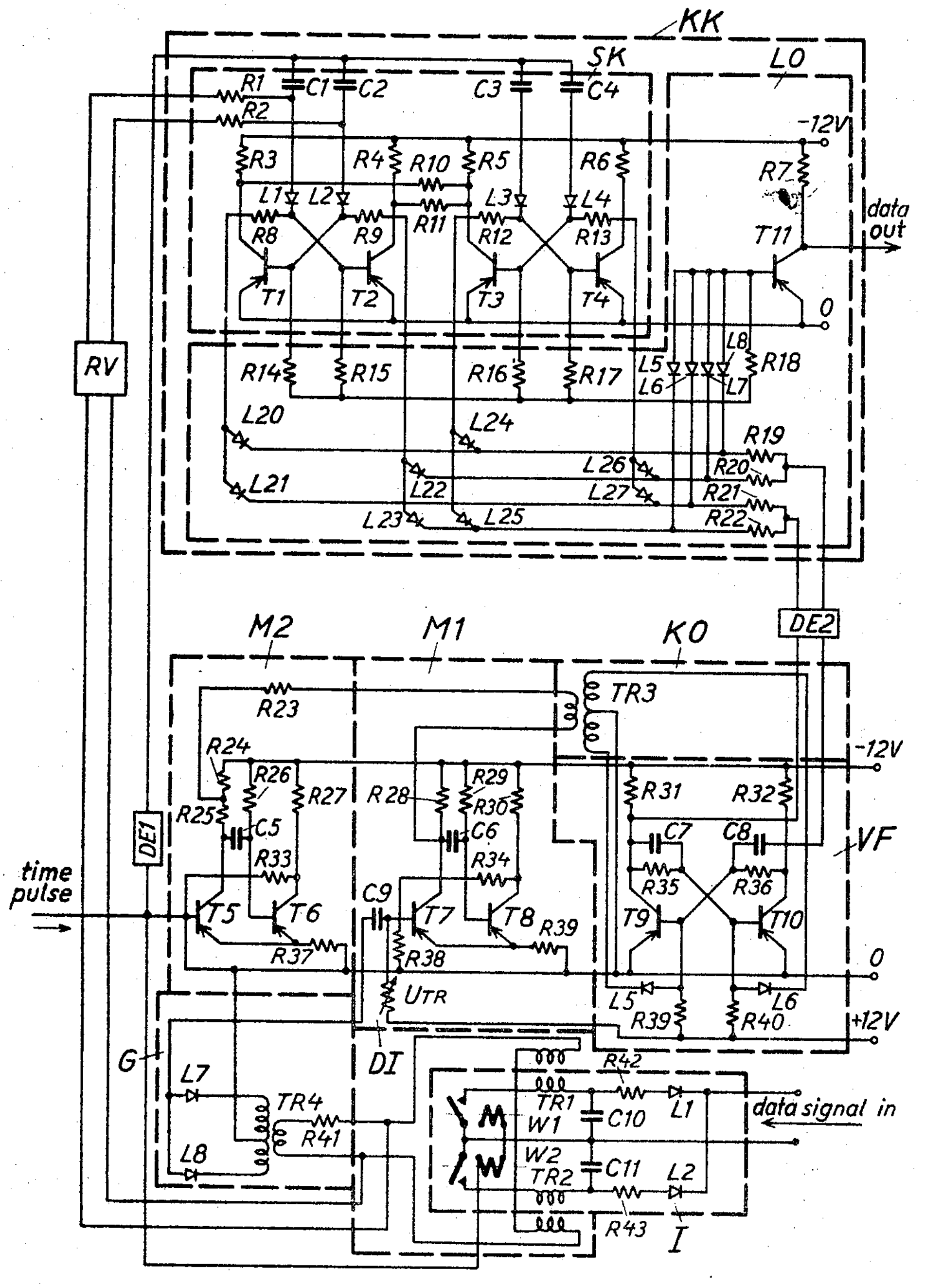

The invention will be explained more closely below by means of an embodiment shown in the accompanying drawing in which FIG. 1 shows a block diagram of the most important parts of a data transmission system using phase shift modulation with differential coding, FIGS. 2*a*–2*h* are waveforms which show the principle of phase shift modulation with differential coding and which explain how a double error can arise, FIGS. 3*a*–3*g* are waveforms which show the principle for eliminating a double error according to the invention, FIG. 4 shows the probability of a reliable reception dependent on the difference between the positive and the negative part of the signal element, FIG. 5 shows a block diagram of an error detecting means and a code correcting means according to the invention, and FIG. 6 shows a more detailed circuit diagram of the arrangement according to FIG. 5.

FIG. 1 shows diagrammatically a data transmission system for phase shift modulation with differential coding. By DS is indicated a data sender which generates binary data signals having two possible polarities which are symbolized by 0 and 1 respectively. These signals are translated in a code translating means KO in such a way that the polarity in the center of the signal element is sensed and if the polarity is 0 there will be no polarity change at the output of the code translating means, i.e. in the signal transmitted. If the polarity is 1, a polarity change will be produced at the output of the code translating means as will be explained more closely in connection with the waveforms of FIGS. 2*a*–2*h*. These code translated signals indicated by E(1) and N(0) are then modulated, sent to the receiver when they are demodulated and are supplied to a code translating means KO in which the original binary data represented by the symbols 0 and 1 are recovered as will also be apparent from FIGS. 2*a*–2*h*.

In FIG. 2, line shows a data signal consisting of a sequence of signal elements or bits, which is to be sent by means of differential coding. Waveform 2*b* shows a clock signal, by means of which the polarity at each signal element center in the sender is sensed. If this polarity is 0, the just existing polarity on the output of the code translating means KO will be maintained, i.e. in the signal transmitted, and if the polarity is 1, a polarity change will occur as is indicated in waveform 2*c*.

Thus a change of polarity between two successive data signal elements in the signal transmitted will be represented as a "1" in the regenerated signal and the equality of polarity between two successive signal elements will be represented by a "0." In view of the fact that in such a system the polarity of a signal element also determines the polarity of the subsequent signal element, a single error will result in a double error as is apparent from the waveforms 2*d*–2*h*. Waveform 2*d* shows the base band signal on the ender side, which contains the information concerning the polarities of the signal elements. If this signal is exposed to interferences, for example by superposing a negative interference signal on a positive signal, the latter may be distorted as is indicated in waveform 2*e*. Thus at the receiver side, instead of the signal indicated in waveform 2*c*, the signal shown in waveform 2*f* will be obtained, in which the intermediate positive signal element has been replaced by a prevailingly negative signal element. During the retranslation of the code, the polarity will be sensed in each signal element and a difference of polarity between two signal elements is represented by "1" (in view of the fact that upon sending, a "1" has resulted in a change of polarity) and upon identity between the polarity of two successive signal elements a "0" will be obtained (in view of the fact that upon sending, a "0" had been represented by unaltered polarity). If, as appears from waveform 2*f*, due to incorrect receiving, the intermediate "N"-signal element has been replaced by an "E"-signal element, the code translating means of the receiver would discover equality of polarity and reproduce a "0"-signal element. In view of the fact that the code translating means of the receiver, also, upon the next sensing, will discover equality of polarity between the two successive signal elements and thus no difference of polarity as would have been the case upon correct receiving, the next signal element will be represented also as a "0" and consequently two successive signal elements will be incorrect. Only in the next sensing will a difference in polarity arise that is represented by a "1." When comparing waveform 2*h* with waveform 2*a* it will be apparent that a double error has arisen.

According to the principle of the invention it is ascertained that there exists the probability of an error. In view of the fact that this error causes that a change of polarity which should occur, does not occur and that a polarity change occurs which should not occur, which causes a double error, a polarity reversal will be carried out in one of the two incorrect signal elements and the double error will be reduced to a single error. Such single error is easy to detect and to eliminate by means of conventional methods. A signal element received without distortion may be defined as consisting of only positive or of only negative areas as is apparent from waveform 2*d*. Through distortion a signal element may contain positive as well as negative parts and as long as the difference is not below a determined threshold value, there exists a certain probability that the signal element is correct. This is indicated in FIG. 4 which shows the probability of a correct reception of a signal element as a function of the difference between the integral of the positive and of the negative areas. The abscissa in FIG. 4 represents the output voltage $\Delta U = I_+ - I_-$ of the integration means, corresponding to the difference between the integrals at the end of each signal element. The curve $\alpha$ indicates the probability that a certain sensing value ΔU is derived from a signal element with the information N, and the curve $\beta$ indicates the probability that the sensing value ΔU is derived from a signal element with the information E. If considering for example the difference value—$\Delta U_1$ this will with a certain probability $p\alpha$ belong to a signal element having the information N. There is also a certain probability $p\beta$ that a signal element with information E in consequence of incorrect receiving due to interference is received as the information N, this probability is however negligible in relation to the first mentioned probability. For values $/\Delta U/ < U_{tr}$, $p\alpha \approx p\beta$ and the signal receiving will be uncertain. According to the invention, for each received signal element that leads to $/\Delta U_1/ < /U_{tr}/$ the polarity of the signal element obtained from the code correcting means KK (FIG. 1) is changed in relation to the polarity which would have been obtained if the receiving had been safe. Thus a single error occurs instead of a double error. This appears from the block diagram according to FIG. 5 and the explaining waveforms 3*a–e* of FIG. 3. The signal received is supplied to an integration means I which, for each signal element, determines the integral of both the positive and the negative part of the signal element. Two signals, each corresponding to one of the integrals, are supplied to a differentiating means DI and the signal obtained therefrom is rectified by means of a rectifier G and is supplied to a monostable circuit M1. The reading out of the integration result and consequently the activation of the monostable circuit M1 occurs in step with the clock means of the receiver, which feeds check- or timing pulses to the integration means I in step with the bit frequency at the limit between two successive signal elements. The same timing pulses are fed to another monostable circuit M2 which, in step with these pulses, produces an output pulse of predetermined unaltered magnitude. The output pulses from the monostable circuit M1 are however dependent on the magnitude of the integral difference, and these two pulses are compared in a comparator KO that produces two alternative signals on its output in dependence on the fact that a pulse has been obtained only by monostable M1 or by monostable M1 as well as monostable M2. Waveform 3*a* indicates those pulses which in correspondence to the difference between the integrals are fed to the monostable circuit M1. As it appears the pulse occurring after the incorrect signal element is, due to the fact that the integral difference lies below the predetermined threshold value, less than the other pulses. This implies that the monostable circuit M1 will not supply any output pulse to the comparator as has been indicated in waveform 3*b*. The threshold value may of course be set in a suitable manner so that the monostable circuit M1 is responsive to greater or smaller differences. Waveform 3*b* shows the pulses obtained from the monostable circuit M2. By VF is designated a bistable circuit that normally, i.e. when there is no error, is located in one, for example, the "1"-position, whereas it will occupy the "0"-position if the comparator produces an output signal corresponding to an incorrect signal element as indicated in waveform 3*b*. The output signal from the bistable circuit VF is supplied to the code correcting means KK where it is used to control a logic circuit LO. The code correcting means also comprises a shift register SK which is always set in correspondence with the polarities of two successive signals. The first stage of the shift register is always operated by the incoming signal through a bistable circuit RV which is supplied by current from the integration means I. The condition of the first stage of the shift register is moved to the second stage in step with the time pulses obtained from the same source from which the integration means I and the monostable circuit M2 obtain their timing pulses. The logic circuit LO may carry out eight alternative functions, four of which are in connection with the common code translating operation in differential coding while the other four functions belong to the correcting operation according to the principle of the invention. The code translated signal that, according to the embodiment, is obtained on the outputs of a bistable circuit VU is dependent on whether the polarity of two successive signal elements is the same or is different as has been explained earlier. If the polarity is the same, a "0" will be obtained. If however the polarity is different, an "1" will be obtained. In other words, the condition of the bistable circuit VU is changed to "1"-condition only when the polarities of two successive signals are different, on the other hand the bistable circuit is maintained in the "0"-condition when they are identical. The outputs from the two successive stages of the shift register are connected together in such a way that, in the case when the condition of the first stage is 0 and of the second stage is 1, the "and"-circuit OK3 may be activated and when the condition of the first stage is 1 and of the second stage is 0, the "and"-circuit OK4 may be activated and it sets to "1", through the "or"-circuit EK1, the bistable circuit VU. If on the other hand the condition of both stages is "1" or "0", the "and"-circuit OK7 and OK8 may be activated, which implies that the bistable circuit VU is maintained in its "0"-condition. There is also a third condition, viz. that the receiving is correct, in other words that the bistable circuit VF is in "1"-condition. Thus, upon correct receiving, each difference in polarity of two successive signals will correspond to a "1"-signal while, without such a difference of polarity, the output signal will be unaltered 0. If the received signal were incorrect, this implies that the bistable circuit VF is in the "0"-condition and that it is necessary to produce a reversal of polarity in the bistable circuit VU, also, when the polarities of two successive signal elements are the same respectively to prevent change of polarity when the polarity is different. For this purpose the outputs from the shift register and from the error indicating bistable circuit VF are combined to four "and"-circuits OK1, OK2, OK5 and OK6, the two first of which will be activated in the case when an error has occurred and the polarities of the two successive signal elements are the same, and the other two when the polarities are different. In the two first mentioned cases the bistable circuit VU will be brought to "1"-condition and a double error is avoided which would have arisen in consequence of the fact that two successive changes of polarity have not occurred. In the two last mentioned cases, i.e. when an error has been discovered but the two successive signals have different polarity, the correction will be carried out in such a way that instead of bringing the bistable circuit VU to the "1"-condition, it will be maintained in the "0"-condition. The conditions are apparent from waveforms 3*e*–3*g*, of which waveform 3*e* shows the polarity as a function of time in the first stage of the shift register SK while waveform 3*f* shows the polarity as a function of time in the second stage of the shift register. The timing operation of polarity according to waveform 3*g* corresponds to that according to waveform 2*h* only until it has been discovered at the end of the incorrect signal that an error exists and the error indicating bistable circuit VF is switched. Then the "and"-circuit OK1 may be activated and reversal of polarity may occur in the bistable circuit VU in spite of the fact that the polarities of the two successive signal elements were the same. In waveform 3*g* is shown the signal which, by the correction has switched to opposite polarity in relation to the corresponding signal in waveform 2*h*, so that the double error has been reduced to a single error. In view of the fact that the change of polarity has to occur half a period after the arriving of the timing pulses, it is necessary to introduce a corresponding delay for the timing pulses themselves, which is symbolized by a delay means DE1, as well as for the output signals from the error indicating bistable circuit VF, which is symbolized by a delay means DE2.

FIG. 6 shows a circuit diagram corresponding to the block diagram according to FIG. 5. Each circuit in FIG. 6 has the same designation as in the block diagram in FIG. 5. In view of the fact that all circuits are of conventional type and only their mutual interaction is essential, these circuits are described very briefly. The integration circuit I includes in a known manner a rectifier L1 and a capacitance C10 and L2, C11 respectively, the circuit of which is closed in step with the check pulses as indicated symbolically by two relays W1, W2. The integrated current values are transmitted through transformers TR1 and TR2 to a difference circuit formed by the series-connected secondary windings of the transformers. The rectifier circuit G and the monostable circuits M1 and M2 are of the usual type, as is the error indicating bistable circuit VF. The comparator KO consists of a transformer TR3 the primary winding of which receives the output signals of the monostable circuits M1 and M2 in series and the secondary winding of which has its ends connected to the transistor bases of the error indicating bistable circuit VF. The shift register SK is of a usual type and the logic circuit LO is formed by diodes L5–L8 and L20–L27 connected between the four outputs of the shift register and the two outputs of the error indicating bistable circuit VF in the combinations mentioned in connection with FIG. 5. The bistable circuit VU consists of a transistor, the emitter-collector circuit of which is connected between −10 volts and 0 volt and the collector of which when fulfilling the four conditions mentioned in connection with FIG. 5 has 0-potential when conducting while otherwise its collector electrode is at −12 volt-potential.

I claim:

1. In the receiver of a data communication system which utilizes phase shift modulation and differential coding wherein the polarity of each received data signal element is compared with the polarity of the preceding received data signal element such that a polarity difference represents one of the two possible binary values of the demodulated data signal elements, apparatus for detecting and at least partially correcting a double error resulting either from an erroneously occurring difference or equality of polarity of two adjacently received data signal elements, said apparatus comprising integrating means for separately integrating each polarity lobe of each data signal element to provide two integrated signals, means for generating a difference signal representing the difference of the two integrated signals, means for comparing the magnitude of the difference signal with a threshold value such that when the magnitude of the difference signal is less than the threshold value, the polarity of the related data signal cannot be unambiguously determined, said integrating means including means for transmitting an error indicating signal when the magnitude of the difference signal is less than the threshold value, and means for changing the binary value of the related data signal in accordance with the presence or absence of said error indicating signal whereby a double error is reduced to a single error.

References Cited

UNITED STATES PATENTS

| | | | |
|---|---|---|---|
| 3,144,608 | 9/1964 | Warring | 178—66 X |
| 3,128,343 | 4/1964 | Baker | 178—67 |
| 3,353,101 | 11/1967 | Kazuo Kawai et al. | 178—67 X |

MALCOLM A. MORRISON, *Primary Examiner.*

C. E. ATKINSON, *Assistant Examiner.*

U.S. Cl. X.R.

328—109